US008887591B2

(12) United States Patent
Mili et al.

(10) Patent No.: US 8,887,591 B2
(45) Date of Patent: Nov. 18, 2014

(54) GEARED DRIVE UNIT

(75) Inventors: Tarek Mili, Karlsruhe (DE); Detlef Lauk, Renchen (DE)

(73) Assignee: Robert Bosch GmbH, Stuttgart (DE)

( * ) Notice: Subject to any disclaimer, the term of this patent is extended or adjusted under 35 U.S.C. 154(b) by 355 days.

(21) Appl. No.: 13/496,918

(22) PCT Filed: Jul. 22, 2010

(86) PCT No.: PCT/EP2010/060625
§ 371 (c)(1),
(2), (4) Date: Jun. 18, 2012

(87) PCT Pub. No.: WO2011/032759
PCT Pub. Date: Mar. 24, 2011

(65) Prior Publication Data

US 2012/0247245 A1 Oct. 4, 2012

(30) Foreign Application Priority Data

Sep. 17, 2009 (DE) ........................ 10 2009 029 530

(51) Int. Cl.
*F16H 57/00* (2012.01)
*E05F 15/16* (2006.01)

(52) U.S. Cl.
CPC ......... *E05F 15/1692* (2013.01); *E05Y 2900/55* (2013.01); *E05Y 2201/49* (2013.01)
USPC .............................. 74/411.5; 74/425; 74/7 D

(58) Field of Classification Search
CPC ............ E05Y 2900/55; E05Y 2201/49; E05F 15/1692
USPC ......................... 74/425, 7 D, 411.5, 416, 458
See application file for complete search history.

(56) References Cited

U.S. PATENT DOCUMENTS 3,667,312 A * 6/1972 Dahl ............................... 74/425
4,367,660 A * 1/1983 Becker et al. ................... 74/625
4,924,721 A * 5/1990 Garrido et al. .................. 74/425

(Continued)

FOREIGN PATENT DOCUMENTS

CN 1653242 8/2005
DE 102005012937 9/2006

(Continued)

OTHER PUBLICATIONS

PCT/EP2010/060825 International Search Report dated Oct. 21, 2010 (Translation and Original, 4 pages).

*Primary Examiner* — David M Fenstermacher
(74) *Attorney, Agent, or Firm* — Michael Best & Friedrich LLP

(57) ABSTRACT

The invention relates to a geared drive unit (10), in particular a window-lifter drive, comprises a drive-side gear element (11) rotatably mounted in a gear housing (15), by means of which gear element a drive torque can be transmitted to at least one driving element (25, 26) of an output-side coupling element (20). Further, a load torque block is provided, by means of which a torque initiated by the output-side coupling element (20) via the at least one driving element (25, 26) can be blocked, wherein the load torque block comprises a blocking element (42), preferably in the form of a wrap spring, which interacts with an element that is non-rotatably mounted in the gear housing (15) to block the torque. According to the invention, the non-rotatably mounted element is simultaneously constructed as a radial bearing for the drive-side gear element (11).

14 Claims, 2 Drawing Sheets

(56) References Cited

U.S. PATENT DOCUMENTS

| | | | | |
|---|---|---|---|---|
| 4,961,392 | A * | 10/1990 | Ballard | 114/161 |
| 6,655,089 | B2 | 12/2003 | Le Gallo | |
| 7,331,252 | B2 * | 2/2008 | Pachov | 74/425 |
| 7,464,620 | B2 * | 12/2008 | Li et al. | 74/425 |
| 2010/0043294 | A1 | 2/2010 | Klippert et al. | |

FOREIGN PATENT DOCUMENTS

| | | |
|---|---|---|
| DE | 102007006173 | 8/2007 |
| WO | 2006100174 | 9/2006 |

* cited by examiner

GEARED DRIVE UNIT

BACKGROUND OF THE INVENTION

The invention relates to a geared drive unit.

A geared drive unit of this type is known from the German patent publication DE 10 2005 012 938 A1. In the geared drive unit from prior art, which is embodied as a window-lifter drive, a spur gear designed as a drive element is mounted on a drive shaft which in turn is fixed in an axle. Provision is further made for a blocking element in the form of a wrap spring, which is mounted within a fixedly disposed hollow shaft. Various components are provided to mount the spur gear and the wrap spring. This involves the tolerances of the components having to be accordingly adapted, which requires a complex and therefore relatively expensive production.

SUMMARY OF THE INVENTION

The invention therefore aims to further develop a geared drive unit according to the preamble of claim 1 in such a way that a simpler and therefore more cost effective manufacturability is facilitated. This aim is met according to the invention with a geared drive unit having the features of claim 1. The idea underlying the invention is then to provide a single component for the mounting of the gear element and the blocking element, which in addition to its function of supporting the blocking element takes on the radial support of gear element. As a result, it is necessary to manufacture only a single component in the desired degree of precision.

In order to ensure on the one hand wear resistance and on the other hand low noise emission, provision is made in an advantageous modification to the invention for the non-rotatably mounted element to be a brake drum made from metal or plastic material and for the gear element to be a spur gear made from plastic material.

The geared drive unit can be particularly cost effectively manufactured and is compact in design if the brake drum is configured substantially in the form of a sleeve or cup and serves with the outer wall thereof as a bearing for the spur gear and with the inner wall thereof as a bearing for the blocking element.

The invention thereby provides in an advantageous modification for ribs, which serve as bearing contact surfaces for the spur gear, to be molded on the outer wall of the brake drum or on the cylindrical inner wall of the spur gear in order to reduce the friction between said spur gear and said brake drum.

In so doing, it is particularly advantageous if the ribs are disposed at uniform angular distances to each other and extend in the longitudinal direction; thus facilitating an evenly distributed loading of the bearing and even wear thereto.

In order to facilitate a simple and cost effective option of manufacturing the ribs, it is thereby advantageous for said ribs to be formed or respectively integrally molded on the spur gear and for said spur gear to be embodied as an injection-molded part.

Provision is made according to the invention in a further preferred embodiment for the brake drum to comprise radially disposed fastening lugs, which engage in corresponding recesses of the gear housing in a positive-locking manner. A reliable and simple fastening of the brake drum in the gear housing is thereby facilitated.

In order to facilitate a simple assembly of the components and especially the spur gear, provision is furthermore made according to the invention for the spur gear to be mounted axially within the gear housing between a base of the housing and a housing cover which is designed as a separate component.

In order to facilitate a mechanical decoupling of the coupling element and the spur gear interacting with said coupling element, it is furthermore advantageous if said coupling element is rotatably mounted on a bearing pin, which is concentrically disposed with respect to the brake drum, and engages in recesses of said spur gear with driving elements disposed parallel to the axis and having radial play.

Bearing pins can in this case be simply and cost effectively as well as precisely manufactured if said pins are formed integrally with the gear housing made from plastic material.

BRIEF DESCRIPTION OF THE DRAWINGS

Further advantages, features and details of the invention ensue from the following description of preferred exemplary embodiments as well as with the aid of the drawings.

Said drawings depict in.

DETAILED DESCRIPTION

Figure 1:
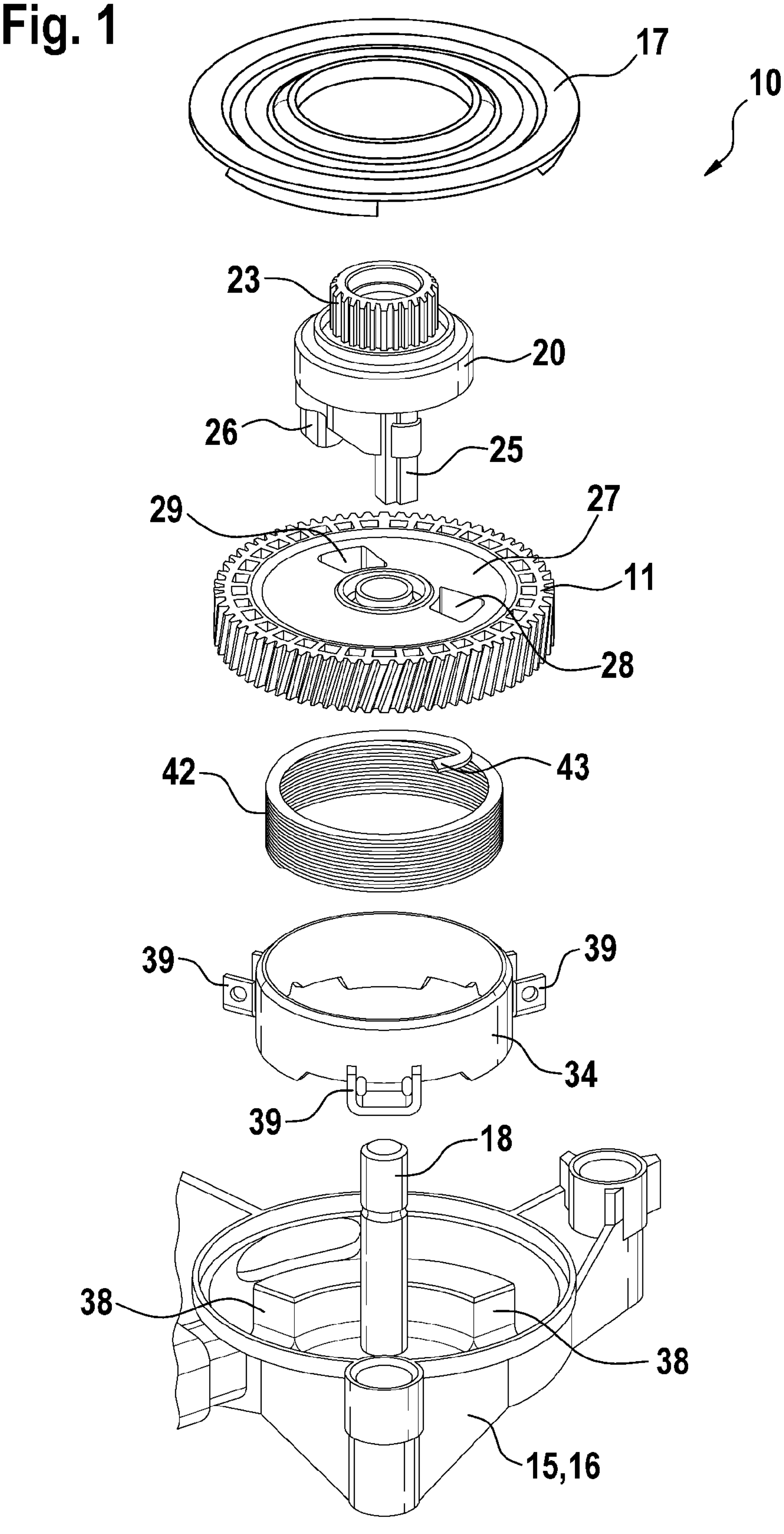
FIG. 1 an exploded view of a geared drive unit according to the invention and FIG. 2 a longitudinal section through the assembled geared drive unit pursuant to FIG. 1.
Figure 2:
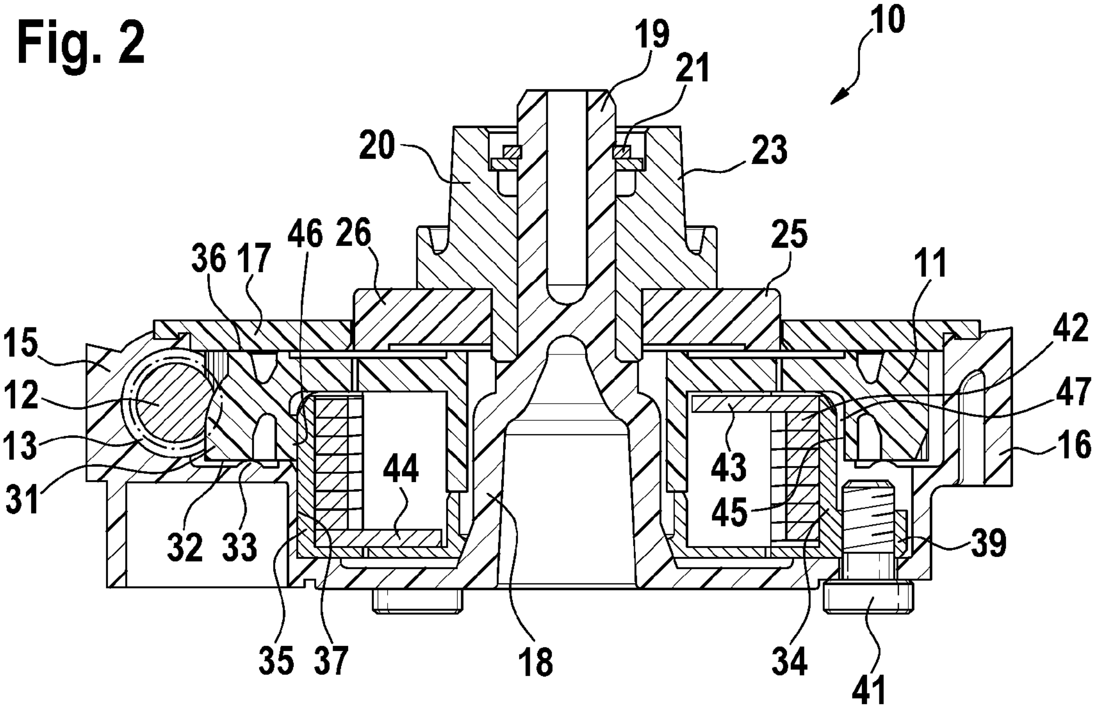

A geared drive unit 10 for an adjustment drive in a motor vehicle, in particular for a window-lifter drive, is depicted in the figures. The geared drive unit 10 comprises a gear element configured as a helical cut output gear wheel made from plastic material, which is referred to below as a spur gear 11. The spur gear 11 is driven by an electric motor, which is not depicted, as in the German patent publication DE 10 2005 012 938 A1. In this case, the electric motor has a drive shaft 12 likewise comprising a helical cut gear wheel 13, which meshes with the external teeth of said spur gear 11. Said spur gear 11 is accommodated in a gear housing 15 of the geared drive unit 10, wherein said housing is made from plastic material.

The gear housing 15 comprises a cup-shaped base part 16 and a housing cover 17 disposed on the top side of the base part 16. The housing cover 17 is of annular design and can interlock with said base part 16 especially in a positive locking manner. A bearing pin 18 is formed integrally with said gear housing 15, one end 19 of which projects out of said gear housing 15. An output-side coupling element 20 is rotatably mounted on the bearing pin 18. The output-side coupling element 20 is axially secured on said bearing pin 18 by means of a shaft circlip.

The output-side coupling element 20 has toothing 23 on the side thereof facing away from the housing cover 17, via which the drive torque of the electric motor can be transmitted to a mechanical or kinematic system of a window lifter, whereby a window pane is displaced as the movable part. Said output-side coupling element 20 further comprises two driving elements 25, 26, which extend parallel to one another and are spaced apart from the bearing pin 18, wherein said driving elements project into the gear housing 15. For this purpose, two recesses 28, 29 are configured in the disc-shaped top side 27 of the spur gear 11 (FIG. 1).

The spur gear 11 is axially positioned or rather mounted with the gear ring 31 thereof in the gear housing 15. To this end, the bottom side 32 of said gear ring 31 is supported, for example, and hence non-restrictively on an annularly configured base region 33 of the base part 16 of the gear housing 15.

The top side 36 of said gear ring 31 is in turn disposed so as to operatively connect to said housing cover 17.

A brake drum 34 made from metal or plastic material is disposed in the gear housing 15 partially within the gear ring 31 and on the side facing away from the housing cover 17. In so doing, the brake drum 34, which is configured substantially in the form of a sleeve or cup, fits closely with the part of its outer wall 35 situated below the spur gear 11 to a cylindrically configured wall 37 of the base part 16. The wall 37 in said base part 16 further comprises a plurality of recesses 38, in which fastening lugs 39 of said brake drum 34 engage in a positive-locking manner. The fastening lugs 39 of said brake drum 34 are fixed using fastening screws 41 in the through-holes which are configured on the bottom side of said base part 16.

A blocking element in the form of a wrap spring 42, which acts as a load torque block, is disposed within the brake drum 34. The wrap spring 42 has two ends 43, 44, which protrude radially inwards and interact with the driving elements 25, 26 of the output-side coupling element 20. Said wrap spring 42 takes up practically the entire height of the wall 35 of the brake drum 34 and is radially disposed at only a small distance away from the inner side of said wall 35, thus enabling said wall 35 to serve on the inner side thereof as a bearing contact surface for said wrap spring 42.

Provision is made according to the invention for the wall 35 of the brake drum 34 to not only serve to accommodate or respectively mount the wrap spring 42 but also to radially support the spur gear 11. To meet this end, the invention provides for a plurality of bearing ribs 46, which are disposed at uniform angular distances from one another, to be configured on the circumferential inner side 45 of the gear ring 31 of the spur gear 11. The bearing ribs 46 thereby interact with the region of the wall 35 of the brake drum 34, which is situated above the bottom region 32 of the base part 16, in that said bearing ribs 46 rest against the outer side of said wall 35 or are spaced apart from said outer side of said wall with a minimum amount of clearance.

The bearing ribs 46 extending in the longitudinal direction are preferably formed integrally with the inner side 45, which can be cost effectively implemented if the spur gear 11 is embodied as an injection-molded part Annular gaps 47 are configured between said spur gear 11 and the brake drum 34 in the regions, in which no bearing ribs 46 are situated.

When the geared drive unit 10 is operating, a torque initiated by the electric motor over the drive shaft 12 is transmitted, as previously described, to the output-side coupling element 20 via the spur gear 11 and the driving elements 25, 26. If a torque is now initiated via said output-side coupling element 20 into said geared drive unit 10, the ends of the wrap spring 42, which are disposed so as to operatively connect to the driving elements 25, 26, cause said wrap spring 42 to expand in its diameter and in so doing to rest against the inner surface of the wall 35 of the brake drum 34. Through this action, the movement of said driving elements 25, 26, which are in turn connected to the spur gear 11 via the recesses 28, 29, is stopped.

In addition, it should be mentioned that the bearing ribs 46 can also be disposed on the brake drum 34 instead of on the spur gear 11. The implementation of bearing ribs can also be completely omitted depending upon the application.

The invention claimed is:

1. A geared drive unit (10), comprising a drive-side gear element (11) rotatably mounted in a gear housing (15), by means of which gear element a drive torque can be transmitted to at least one driving element (25, 26) of an output-side coupling element (20), and comprising a load torque block, by means of which a torque initiated by the output-side coupling element (20) via the at least one driving element (25, 26) can be blocked, wherein the load torque block comprises a blocking element (42), which interacts with an element that is non-rotatably mounted in the gear housing (15) to block the torque, characterized in that the non-rotatably mounted element also functions as a radial bearing for the drive-side gear element (11), wherein the non-rotatably mounted element is a brake drum (34) made from metal or plastic material and the gear element is a spur gear (11) made from plastic material, and wherein the brake drum (34) is configured substantially in the form of a sleeve or cup and serves with an outer wall (35) thereof as a bearing for the spur gear (11) and with an inner wall thereof as a bearing for the blocking element (42).

2. The geared drive unit according to claim 1, characterized in that ribs (46), which act as bearing contact surfaces for the spur gear (11), are formed on at least one of an outer wall of the brake drum (34) and an inner side (45) of a gear ring (31) of said spur gear (11).

3. The geared drive unit according to claim 2, characterized in that the ribs (46) are disposed at uniform angular distances to each other and extend in a longitudinal direction.

4. The geared drive unit according to claim 2, characterized in that the ribs (46) are constructed on the spur gear (11) and in that said spur gear (11) is an injection-molded part.

5. The geared drive unit according to claim 1, characterized in that the brake drum (34) comprises radially disposed fastening lugs (39), which engage in recesses (38) of the gear housing (15) in a positive-locking manner.

6. The geared drive unit according to claim 1, characterized in that the spur gear (11) is mounted axially within the gear housing (15) between a base of said housing (33) and a housing cover (17) which is a separate component.

7. The geared drive unit according to claim 6, characterized in that the coupling element (20) is rotatably mounted on a bearing pin (18) disposed concentrically to the brake drum (34) and engages in recesses (28, 29) of the spur gear (11) with driving elements (25, 26) disposed axially parallel to the bearing pin (18) and having radial play.

8. The geared drive unit according to claim 7, characterized in that the bearing pin (18) is formed integrally with a plastic housing part (16) of the gear housing (15).

9. The geared drive unit according to claim 2, characterized in that the ribs (46) are disposed at uniform angular distances to each other and extend in a longitudinal direction.

10. The geared drive unit according to claim 9, characterized in that the ribs (46) are constructed on the spur gear (11) and in that said spur gear (11) is an injection-molded part.

11. The geared drive unit according to claim 10, characterized in that the brake drum (34) comprises radially disposed fastening lugs (39), which engage in recesses (38) of the gear housing (15) in a positive-locking manner.

12. The geared drive unit according to claim 11, characterized in that the spur gear (11) is mounted axially within the gear housing (15) between a base of said housing (33) and a housing cover (17) which is a separate component.

13. The geared drive unit according to claim 12, characterized in that the coupling element (20) is rotatably mounted on a bearing pin (18) disposed concentrically to the brake drum (34) and engages in recesses (28, 29) of the spur gear (11) with driving elements (25, 26) disposed axially parallel to the bearing pin (18) and having radial play.

14. The geared drive unit according to claim 13, characterized in that the bearing pin (18) is formed integrally with a plastic housing part (16) of the gear housing (15).

* * * * *